(12) United States Patent
Hori et al.

(10) Patent No.: US 11,624,675 B2
(45) Date of Patent: Apr. 11, 2023

(54) WATER LEAKAGE DETECTION METHOD, WATER LEAKAGE DETECTION APPARATUS, AND VIBRATION SENSOR TERMINAL

(71) Applicant: Hitachi, Ltd., Tokyo (JP)

(72) Inventors: Satoru Hori, Tokyo (JP); Kenji Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 381 days.

(21) Appl. No.: 17/059,584

(22) PCT Filed: Jun. 11, 2018

(86) PCT No.: PCT/JP2018/022253
§ 371 (c)(1),
(2) Date: Nov. 30, 2020

(87) PCT Pub. No.: WO2019/239461
PCT Pub. Date: Dec. 19, 2019

(65) Prior Publication Data
US 2021/0215568 A1 Jul. 15, 2021

(51) Int. Cl.
*G01M 3/24* (2006.01)
*F17D 5/06* (2006.01)
(Continued)

(52) U.S. Cl.
CPC .......... *G01M 3/243* (2013.01); *G01M 3/2807* (2013.01); *G06F 3/14* (2013.01)

(58) Field of Classification Search
CPC .... G01M 3/00; G01M 3/24–28; G01M 3/243; G01M 3/2807; G06F 3/14; F17D 5/00–06
See application file for complete search history.

(56) References Cited

U.S. PATENT DOCUMENTS 10,209,114 B2 * 2/2019 Oh ................... G01M 3/243
2009/0066524 A1 3/2009 Yukawa et al.
(Continued)

FOREIGN PATENT DOCUMENTS

EP 2 838 067 A1 2/2015
JP 2008-064623 A 3/2008
(Continued)

OTHER PUBLICATIONS

International Search Report, dated Jul. 17, 2018, for International Application No. PCT/JP2018/022253.
(Continued)

*Primary Examiner* — Nguyen Q. Ha
(74) *Attorney, Agent, or Firm* — Baker Botts L.L.P.

(57) ABSTRACT

Provided is a water leakage detection method for detecting water leakage of a water pipe by a water leakage detection apparatus that includes a processor and a display device. The method includes: a first procedure of the processor acquiring a water leakage detection result of the water pipe in a district metered area, the district metered area being a range to be measured by a flow meter; a second procedure of the processor acquiring a water leakage detection result of the water pipe obtained based on measurement data of a vibration sensor terminal attached to the water pipe; and a third procedure of the processor outputting, a screen for displaying the water leakage detection result obtained based on the measurement data of the flow meter together with the water leakage detection result obtained.

9 Claims, 14 Drawing Sheets

(51) Int. Cl.
 *G01M 3/28* (2006.01)
 *G06F 3/14* (2006.01)

(56) References Cited

U.S. PATENT DOCUMENTS

| | | | |
|---|---|---|---|
| 2014/0174186 A1* | 6/2014 | Salomon | G01M 3/24 |
| | | | 73/587 |
| 2015/0002300 A1 | 1/2015 | Cho et al. | |
| 2015/0046099 A1 | 2/2015 | Kamoi et al. | |
| 2016/0076964 A1 | 3/2016 | Shinoda et al. | |
| 2018/0136076 A1 | 5/2018 | Kusumura et al. | |
| 2018/0209124 A1* | 7/2018 | Yokokawa | E03B 7/02 |

FOREIGN PATENT DOCUMENTS

| | | |
|---|---|---|
| JP | 2010-048058 A | 3/2010 |
| JP | 2010-203964 A | 9/2010 |
| JP | 2011-191064 A | 9/2011 |
| JP | 2015-194846 A | 11/2015 |
| WO | WO 2013/145493 A1 | 10/2013 |
| WO | WO 2016/181593 A1 | 11/2016 |
| WO | WO 2017/126090 A1 | 7/2017 |

OTHER PUBLICATIONS

Extended European Search Report, dated Nov. 9, 2021, for European Application No. 18922946.1.

* cited by examiner

[FIG. 1]
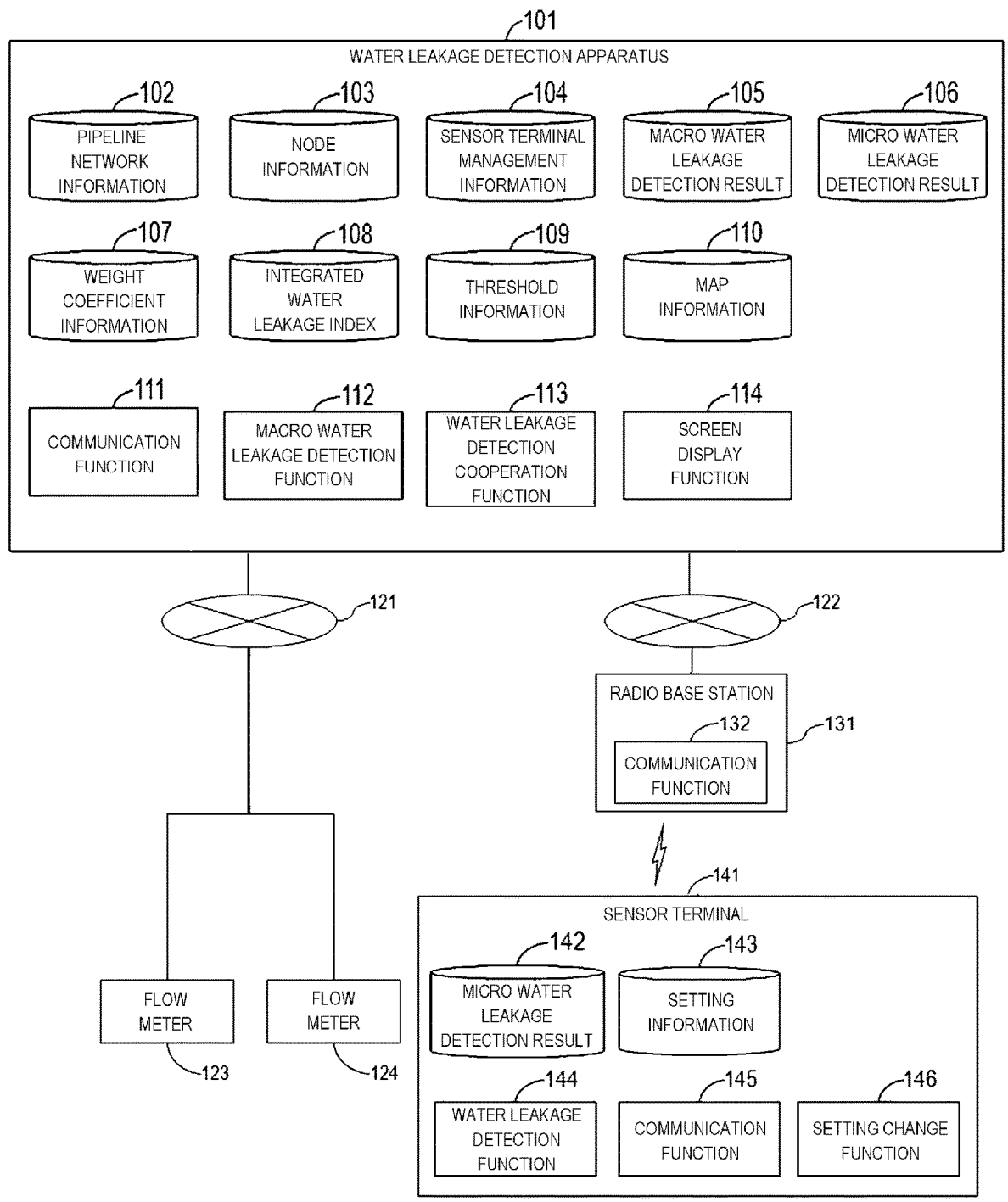

[FIG. 2]
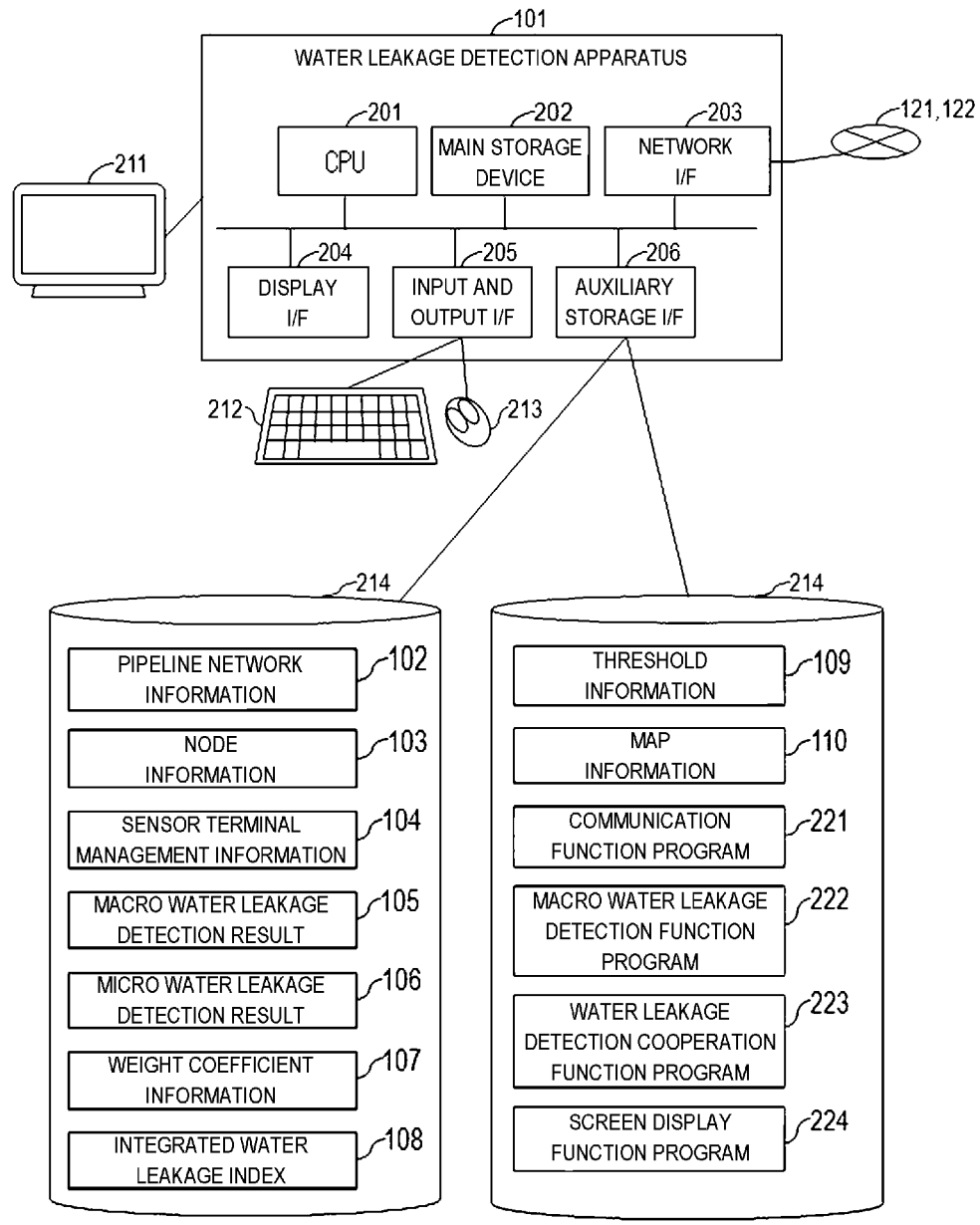

[FIG. 3]
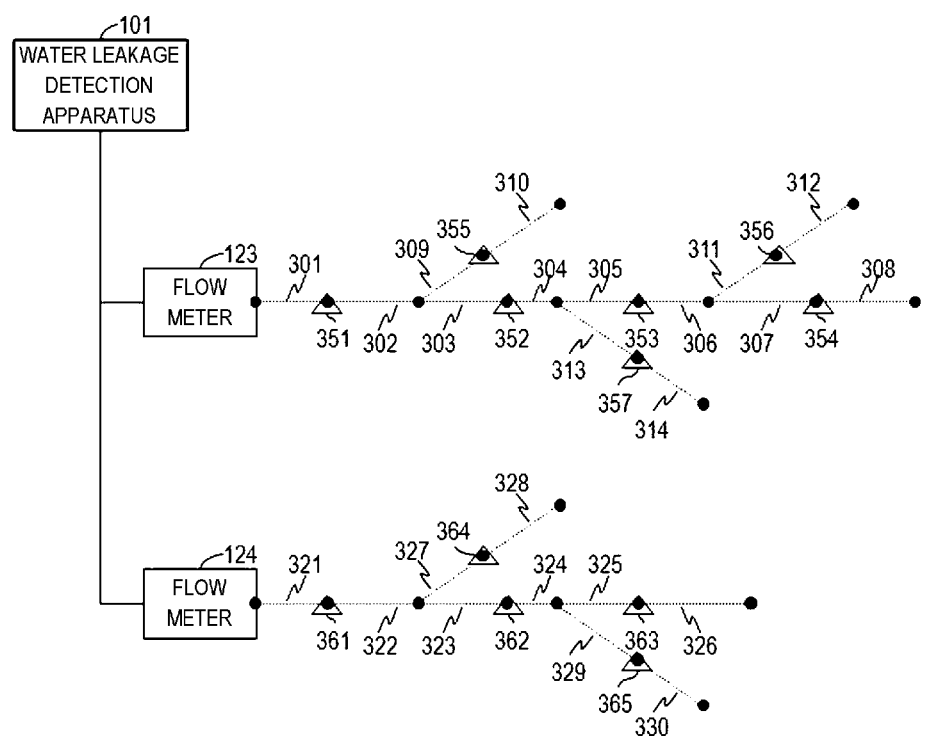

[FIG. 4]

| PIPE ID | DISTRICT METERED AREA ID | DIAMETER | MATERIAL | LENGTH | NODE ID | |
|---|---|---|---|---|---|---|
| 301 | 1 | 600 | DUCTILE | 180 | 1,2 | ← 411 |
| 302 | 1 | 600 | DUCTILE | 179 | 2,3 | ← 412 |
| 303 | 1 | 600 | DUCTILE | 176 | 3,4 | ← 413 |
| 304 | 1 | 600 | DUCTILE | 167 | 4,5 | ← 414 |
| 305 | 1 | 600 | DUCTILE | 137 | 5,6 | ← 415 |
| 306 | 1 | 600 | DUCTILE | 178 | 6,7 | ← 416 |
| 307 | 1 | 600 | DUCTILE | 191 | 7,8 | ← 417 |
| 308 | 1 | 600 | DUCTILE | 178 | 8,9 | ← 418 |
| 309 | 1 | 400 | DUCTILE | 173 | 3,10 | ← 419 |
| 310 | 1 | 400 | DUCTILE | 169 | 10,11 | ← 420 |
| 311 | 1 | 300 | DUCTILE | 198 | 7,12 | ← 421 |
| 312 | 1 | 300 | DUCTILE | 179 | 12,13 | ← 422 |
| 313 | 1 | 450 | DUCTILE | 190 | 5,14 | ← 423 |
| 314 | 1 | 450 | DUCTILE | 156 | 14,15 | ← 424 |
| 321 | 2 | 550 | POLYVINYL CHLORIDE | 182 | 21,22 | ← 431 |
| 322 | 2 | 550 | POLYVINYL CHLORIDE | 172 | 22,23 | ← 432 |
| 323 | 2 | 550 | POLYVINYL CHLORIDE | 184 | 23,24 | ← 433 |
| 324 | 2 | 550 | POLYVINYL CHLORIDE | 189 | 24,25 | ← 434 |
| 325 | 2 | 550 | POLYVINYL CHLORIDE | 183 | 25,26 | ← 435 |
| 326 | 2 | 550 | POLYVINYL CHLORIDE | 192 | 26,27 | ← 436 |
| 327 | 2 | 400 | POLYVINYL CHLORIDE | 167 | 23,28 | ← 437 |
| 328 | 2 | 400 | POLYVINYL CHLORIDE | 156 | 28,29 | ← 438 |
| 329 | 2 | 350 | POLYVINYL CHLORIDE | 189 | 25,30 | ← 439 |
| 330 | 2 | 350 | POLYVINYL CHLORIDE | 162 | 30,31 | ← 440 |

[FIG. 5]

| NODE ID | LATITUDE | LONGITUDE | |
|---|---|---|---|
| 1 | N035244890 | E139324059 | 511 |
| 2 | N035244890 | E139324259 | 512 |
| 3 | N035244890 | E139324459 | 513 |
| 4 | N035244890 | E139324659 | 514 |
| 5 | N035244890 | E139324859 | 515 |
| 6 | N035244890 | E139325059 | 516 |
| 7 | N035244890 | E139325259 | 517 |
| 8 | N035244890 | E139325459 | 518 |
| 9 | N035244890 | E139325659 | 519 |
| 10 | N035245090 | E139324659 | 520 |
| 11 | N035245290 | E139324859 | 521 |
| 12 | N035245090 | E139325059 | 522 |
| 13 | N035245290 | E139325259 | 523 |
| 14 | N035244690 | E139325459 | 524 |
| 15 | N035244490 | E139325659 | 525 |
| 21 | N035242890 | E139324059 | 531 |
| 22 | N035242890 | E139324259 | 532 |
| 23 | N035242890 | E139324459 | 533 |
| 24 | N035242890 | E139324659 | 534 |
| 25 | N035242890 | E139324859 | 535 |
| 26 | N035242890 | E139325059 | 536 |
| 27 | N035242890 | E139325259 | 537 |
| 28 | N035243090 | E139324659 | 538 |
| 29 | N035243290 | E139324859 | 539 |
| 30 | N035242690 | E139325059 | 540 |
| 31 | N035242490 | E139325259 | 541 |

[FIG. 6]

| SENSOR ID | NODE ID | DISTRICT METERED AREA ID | FINAL SETTING CHANGE INFORMATION | FINAL SETTING CHANGE TIME | |
|---|---|---|---|---|---|
| 351 | 2 | 1 | - | - | 611 |
| 352 | 4 | 1 | INCREASE PROCESSING TIME | 2017/12/17 13:50:00 | 612 |
| 353 | 6 | 1 | - | - | 613 |
| 354 | 8 | 1 | - | - | 614 |
| 355 | 10 | 1 | - | - | 615 |
| 356 | 12 | 1 | - | - | 616 |
| 357 | 14 | 1 | - | - | 617 |
| 361 | 22 | 2 | - | - | 618 |
| 362 | 24 | 2 | CHANGE PROCESSING MODE | 2017/12/16 12:45:00 | 619 |
| 363 | 26 | 2 | - | - | 620 |
| 364 | 28 | 2 | - | - | 621 |
| 365 | 30 | 2 | - | - | 622 |

[FIG. 7]

| DISTRICT METERED AREA ID | WATER LEAKAGE PROBABILITY |
|---|---|
| 1 | 50 |
| 2 | 60 |

[FIG. 8]
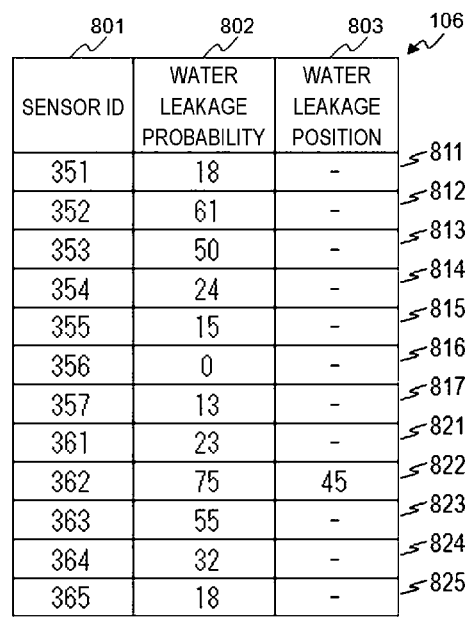

[FIG. 9]

| MATERIAL | WEIGHT |
|---|---|
| DUCTILE | 0.9 |
| POLYVINYL CHLORIDE | 1 |

[FIG. 10]

| SENSOR ID | INTEGRATED WATER LEAKAGE INDEX | WATER LEAKAGE POSITION | |
|---|---|---|---|
| 351 | 0.72 | - | 1011 |
| 352 | 1.15 | - | 1012 |
| 353 | 1.04 | - | 1013 |
| 354 | 0.78 | - | 1014 |
| 355 | 0.51 | - | 1015 |
| 356 | 0.27 | - | 1016 |
| 357 | 0.54 | - | 1017 |
| 361 | 0.89 | - | 1021 |
| 362 | 1.41 | 45 | 1022 |
| 363 | 1.21 | - | 1023 |
| 364 | 0.8 | - | 1024 |
| 365 | 0.6 | - | 1025 |

[FIG. 11]

| THRESHOLD | SETTING CHANGE |
|---|---|
| 1 | INCREASE PROCESSING TIME |
| 1.2 | CHANGE PROCESSING MODE |

[FIG. 12]

| ATTRIBUTE | VALUE |
|---|---|
| PROCESSING TIME | 30 SECONDS |
| PROCESSING CYCLE | 24 HOURS |
| PROCESSING MODE | WATER LEAKAGE DETECTION MODE |

[FIG. 13]
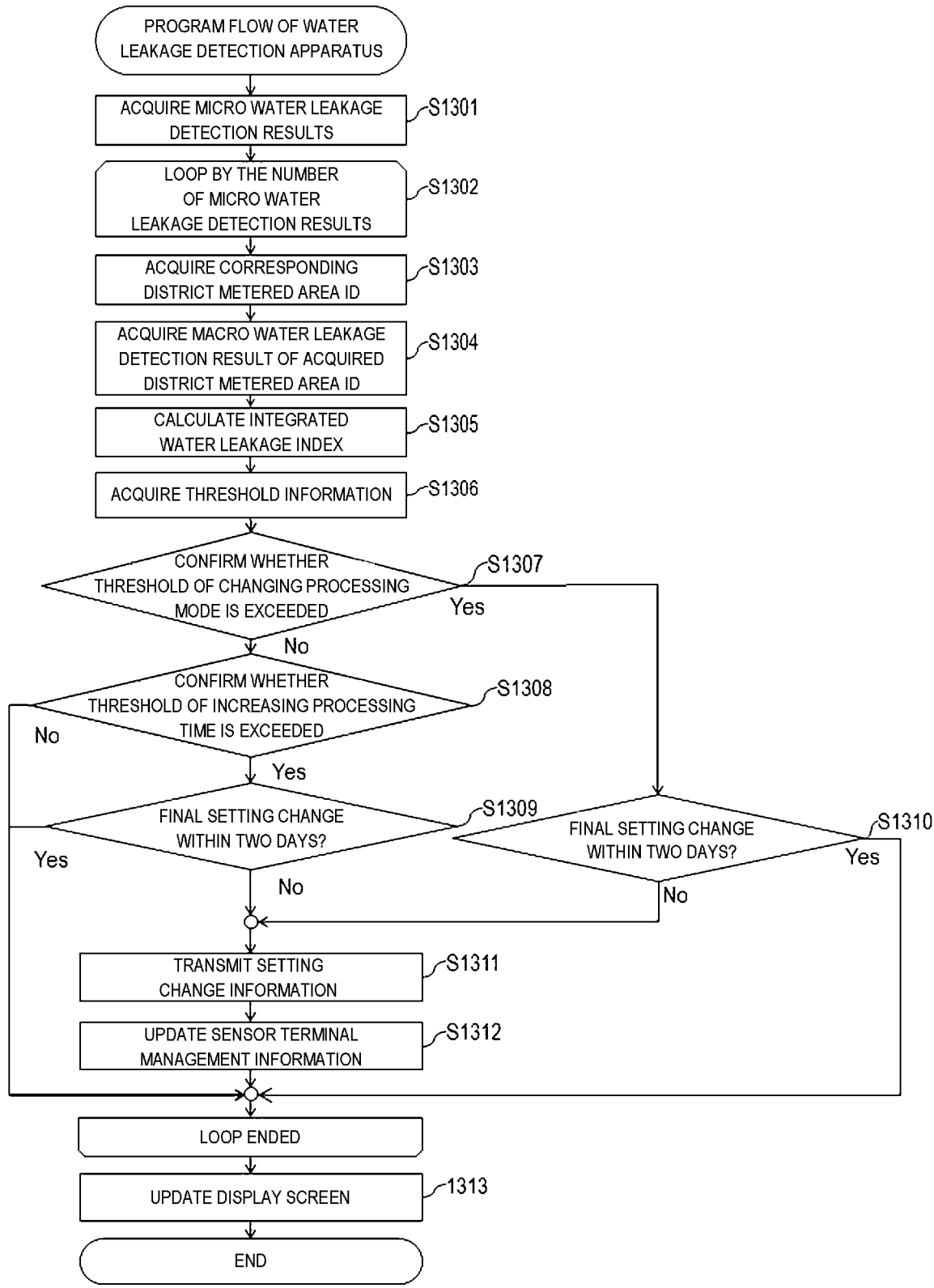

[FIG. 14]
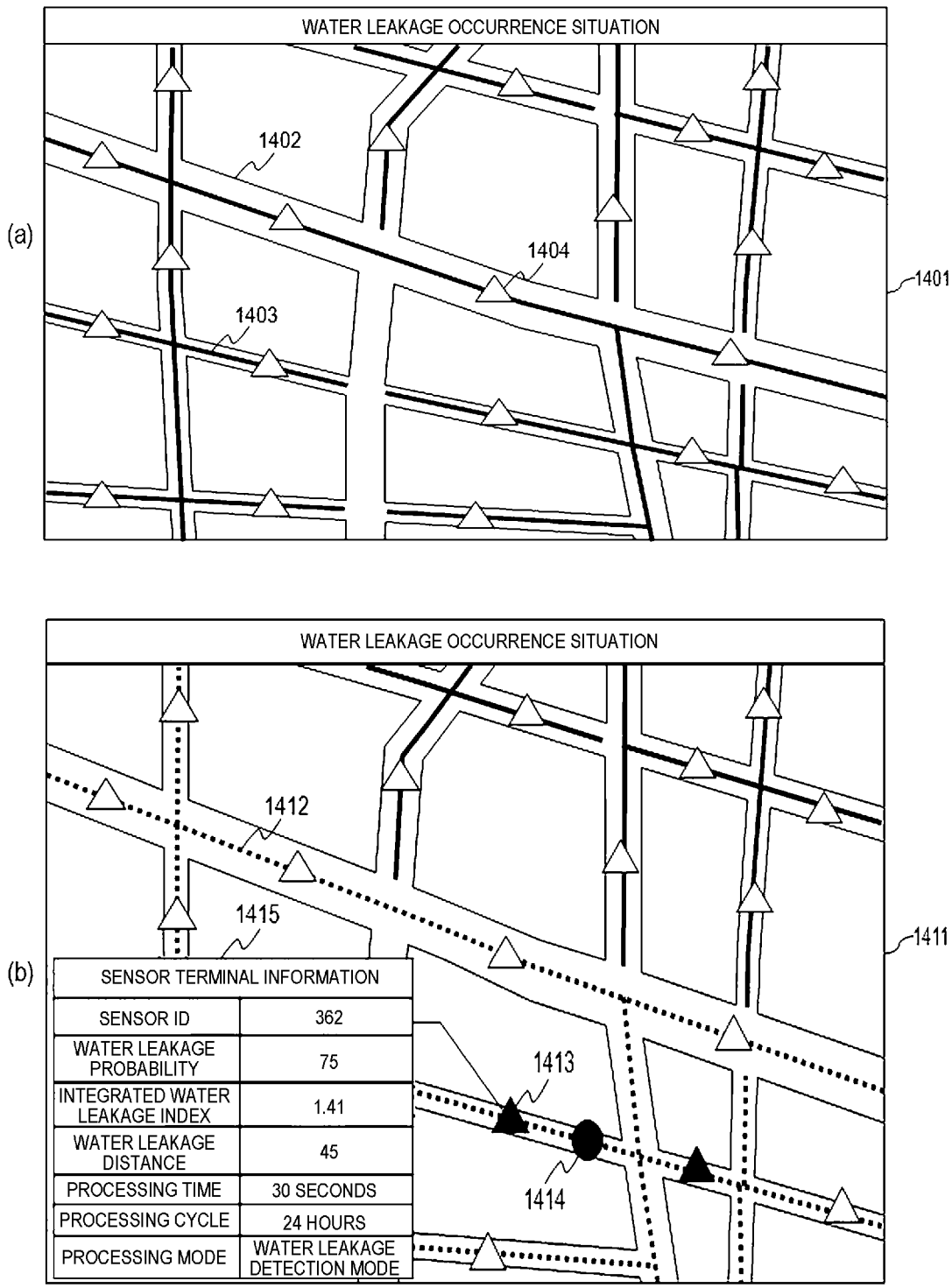

WATER LEAKAGE DETECTION METHOD, WATER LEAKAGE DETECTION APPARATUS, AND VIBRATION SENSOR TERMINAL

TECHNICAL FIELD

The present invention relates to a technique for detecting water leakage from a water pipe.

BACKGROUND ART

For detecting underground water leakage in a water distribution pipeline network that does not appear on a ground surface, in most cases, an on-site inspector periodically performs a water leakage inspection using a leakage sound detection bar or the like, specifies a place where water leakage has likely occurred as an inspection result, and thereafter selectively uses a leak noise correlator to specify a detailed water leakage place in this area.

However, since the inspector needs to go to the site in this method, costs are increased and it is difficult to quickly specify a water leakage place in a wide range.

Since about 20% of water business entities in Japan are operating in the red and aging of facilities is accelerating, it is required to specify such a water leakage place as quickly as possible without human intervention.

For example, PTL 1 discloses a technique for estimating a water leakage place. PTL 1 discloses a water leakage node point estimation apparatus that analyzes collected and accumulated flow rate and pressure data of a water distribution pipeline network in a water distribution pipeline network process of supplying purified water to terminal consumers. The water leakage node point estimation apparatus includes: a faucet water consumption amount storing unit that measures, as a water rate, a water consumption amount of a faucet in a certain cycle and stores the water consumption amount of each faucet; a node point demand amount allocation unit that sets a demand amount of a node point obtained based on the water consumption amount of each faucet; a pipeline network analysis model storing unit that stores a pipeline material that forms a target water distribution pipeline network, extension, a diameter, connection information, a pipeline friction coefficient, and an elevation of each node that is a connection point; a water leakage amount distribution optimizing unit that allocates, as a water leakage amount at each node point, a water leakage amount in the target water distribution pipeline network and sets a water leakage amount allocation amount for each node point; a process data storing unit that stores an inflow rate to the water distribution pipeline network and pressure data in the pipeline network; a pipeline network analysis unit that performs a pipeline network analysis based on a pipeline analysis model from the pipeline network analysis model storing unit, a night flow rate and night pressure data from the process data storing unit, a water leakage amount allocation amount for each node point obtained by the water leakage amount distribution optimizing unit, and a demand amount of each node point obtained by the node point demand amount allocation unit; and a pressure error calculation unit that calculates an error between an estimated pressure value of each node point obtained from the pipeline network analysis unit and an actual pressure value of a pressure measurement point. As is disclosed in PTL 1, the water leakage amount distribution optimizing unit performs an optimization calculation to distribute a water leakage amount to each node point so as to minimize a pressure error obtained by the pressure error calculation unit. The water leakage node point estimation apparatus further includes a night minimum flow rate storing unit that extracts and stores a period during which a flow rate is minimum in one day, and a night minimum flow rate analysis unit that calculates a water leakage amount in the target water distribution pipeline network based on the night minimum flow rate stored in the night minimum flow rate storing unit and the pressure data. The water leakage amount in the water distribution pipeline network is specified based on process data.

PTL 2 discloses a vibration detection device with a sensor-side leak determination unit configured to determine whether or not there is a possibility of a leak in a piping. PTL 3 discloses a pipeline management supporting server capable of remotely detecting an abnormality of a pipeline. And PTL 4 discloses a plurality of leak detection sensor nodes being installed on an underground pipe and configured to be operated according to a plurality of sensor management modes.

CITATION LIST

Patent Literature

PTL 1: JP-A-2010-48058
PTL 2: US 2016/0076964 A1
PTL 3: EP 2 838 067 A1
PTL 4: US 2015/0002300 A1

SUMMARY OF INVENTION

Technical Problem

According to the method disclosed in PTL 1, water leakage can be detected and a water leakage amount in a unit of node point can be estimated using a night minimum flow rate and pressure data without human intervention.

However, since the water leakage amount is calculated based on a difference between the night minimum flow rate and an usual flow rate trend, unstable water usage may be determined as water leakage. Further, since the water leakage amount is estimated in a unit of node point, there is still a problem that a detailed water leakage occurrence position cannot be estimated.

Solution to Problem

In order to solve the problems described above and achieve the object of the invention, a water leakage detection method according to claim 1 is provided. According to another aspect of the present invention, there is provided a water leakage detection apparatus according to claim 4.

Advantageous Effect

According to an aspect of the invention, an occurrence of water leakage and a position where the water leakage occurs can be quickly detected while a battery of a sensor terminal used in water leakage detection can be efficiently used.

Problems, configurations, and effects other than those described above will become apparent from the following description of embodiments.

BRIEF DESCRIPTION OF DRAWINGS

FIG. 1 is a block diagram showing a configuration of a system according to an embodiment of the invention.

FIG. 2 is a block diagram showing a hardware configuration of a water leakage detection apparatus according to the embodiment of the invention.

FIG. 3 is a diagram showing a pipeline network and an arrangement of sensors according to the embodiment of the invention.

FIG. 4 is a diagram showing pipeline network information of the water leakage detection apparatus according to the embodiment of the invention.

FIG. 5 is a diagram showing node information of the water leakage detection apparatus according to the embodiment of the invention.

FIG. 6 is a diagram showing sensor terminal management information of the water leakage detection apparatus according to the embodiment of the invention.

FIG. 7 is a diagram showing a macro water leakage detection result of the water leakage detection apparatus according to the embodiment of the invention.

FIG. 8 is a diagram showing a micro water leakage detection result of the water leakage detection apparatus according to the embodiment of the invention.

FIG. 9 is a diagram showing weight coefficient information of the water leakage detection apparatus according to the embodiment of the invention.

FIG. 10 is a diagram showing an integrated water leakage index of the water leakage detection apparatus according to the embodiment of the invention.

FIG. 11 is a diagram showing threshold information of the water leakage detection apparatus according to the embodiment of the invention.

FIG. 12 is a diagram showing setting information of a sensor terminal according to the embodiment of the invention.

FIG. 13 is a flow chart showing a processing executed, based on a program, by a CPU of the water leakage detection apparatus according to the embodiment of the invention.

FIG. 14 is a diagram showing a water leakage detection result display screen output by the water leakage detection apparatus according to the embodiment of the invention.

DESCRIPTION OF EMBODIMENTS

According to an embodiment of the invention, an operation during setting change of a sensor terminal installed at a water pipe based on a water leakage detection result using data of a flow meter installed at the water pipe and a water leakage detection result using data of the sensor terminal will be described.

FIG. 1 is a block diagram showing a configuration of a system according to an embodiment of the invention.

A water leakage detection apparatus 101 is an apparatus that detects water leakage of a water pipe and is connected with a network 121 and a network 122.

The water leakage detection apparatus 101 includes pipeline network information 102, node information 103, sensor terminal management information 104, a macro water leakage detection result 105, a micro water leakage detection result 106, weight coefficient information 107, an integrated water leakage index 108, threshold information 109, map information 110, a communication function 111, a macro water leakage detection function 112, a water leakage detection cooperation function 113, and a screen display function 114.

The pipeline network information 102 manages information about water pipes. The node information 103 manages information of endpoints of water pipes. The sensor terminal management information 104 manages information of a sensor terminal attached to a water pipe. The macro water leakage detection result 105 is a processing result of the macro water leakage detection function 112 and includes a water leakage detection result obtained based on measurement data of a flow meter. The micro water leakage detection result 106 is a processing result of a water leakage detection function 144 of a sensor terminal 141 and includes a water leakage detection result obtained based on measurement data of the sensor terminal 141. Content of the micro water leakage detection result 106 is sent from the sensor terminal 141.

The weight coefficient information 107 is information indicating a weight of the macro water leakage detection result 105 when the integrated water leakage index 108 is calculated. The integrated water leakage index 108 is an integrated index of water leakage calculated based on the macro water leakage detection result 105, the micro water leakage detection result 106, and the weight coefficient information 107. The larger a value of the integrated water leakage index, the higher an occurrence probability of water leakage. The threshold information 109 defines a relationship between a value of the integrated water leakage index 108 and a setting change of the sensor terminal 141. The map information 110 is map information of an area including a place where a water pipe to be managed is located. For example, the map information 110 is data of a standard format such as a JPGIS format.

The communication function 111 is a function of communicating with flow meters 123 and 124 and a radio base station 131. The macro water leakage detection function 112 is a function of detecting water leakage using data acquired from the flowmeters 123 and 124. The water leakage detection cooperation function 113 is a function of calculating the integrated water leakage index 108 based on the macro water leakage detection result 105, the micro water leakage detection result 106, and the weight coefficient information 107, and changing setting specified by the threshold information 109 according to the calculated value. The screen display function 114 is a function of displaying various kinds of information for a user.

The network 121 is a device for exchanging messages and packets between devices using radio waves, light, sound, electric signals, and the like. The network 121 includes a router, a cable, and the like, and is connected with the water leakage detection apparatus 101 and the flow meters 123 and 124.

The network 122 is a device for exchanging messages and packets between devices using radio waves, light, sound, electric signals, and the like in the same manner as the network 121. The network 122 includes a router, a cable, and the like, and is connected with the water leakage detection apparatus 101 and the radio base station 131.

Each of the flow meters 123 and 124 is a device that measures a flow rate of water at a place where each of the flow meters 123 and 124 is installed, and is connected with the network 121. Although only two flow meters 123 and 124 are described in the present embodiment for the sake of explanation, more flow meters may be connected to the network 121 in practice.

The radio base station 131 is a device capable of exchanging messages or packets between devices using radio waves, and is connected with the network 122. The radio base station 131 is wirelessly connected with the sensor terminal 141.

The radio base station 131 includes a communication function 132 that communicates with the water leakage detection apparatus 101 and the sensor terminal 141.

The sensor terminal 141 is a device that is attached to a water pipe to measure vibration of the water pipe (a vibration sensor terminal), and is wirelessly connected with the radio base station 131. Although only one sensor terminal 141 is shown in FIG. 1, a plurality of sensor terminals 141 are attached in practice (see FIG. 3).

The sensor terminal 141 includes a micro water leakage detection result 142 which is a processing result of the water leakage detection function 144, setting information 143 which is setting of the water leakage detection function 144, the water leakage detection function 144 that measures vibration of a water pipe and detects water leakage based on the vibration, a communication function 145 that communicates with the radio base station 131, and a setting change function 146 that changes the setting information 143.

The macro water leakage detection function 112 of the water leakage detection apparatus 101 calculates in advance an average and a variance of flow rates at normal time for each day of a week and each hour based on data acquired by the flow meters 123 and 124, and detects water leakage by comparing the data acquired by the flow meters 123 and 124 with the average and the variance of the flow rates at normal time. Generally, since the flow meters 123 and 124 are connected to a power supply (a power supply that is not drained as long as the power supply is normally operated, such as a commercial power supply) via a cable, data can be acquired in a short cycle, for example, every minute. Therefore, water leakage can be detected in real time. Although an example in which only flow meters are connected in a water pipe is described, a pressure gauge may be attached to the water pipe. In this case, data of the flow meter and data of the pressure gauge may be used. Water leakage can be detected with high accuracy by also using the data of the pressure gauge.

The sensor terminal 141 is operated by electric power supplied from a battery (not shown). Therefore, the water leakage detection function 144 and the communication function 145 cannot be operated for a long period and cannot be operated frequently. The water leakage detection function 144 can detect water leakage more accurately as vibration data of a water pipe to be processed is measured over a longer period.

Further, the sensor terminal 141 can set either a water leakage detection mode in which occurrence of water leakage can be detected (for example, a water leakage probability can be calculated) but a water leakage position cannot be detected or a water leakage position detection mode in which a water leakage position can be detected. A water leakage probability cannot be calculated in the water leakage position detection mode. A water leakage position that can be detected in the water leakage position detection mode is meaningful data only when water leakage occurs.

As described above, since the sensor terminal 141 is operated by a battery, an operation of the sensor terminal 141 is stopped if the battery is drained. When a drained battery is to be replaced (or charged), a work load is very large since a large number of sensor terminals 141 are installed in the pipeline network, which will be described later. In order to reduce the work load, it is desirable to reduce power consumption of the sensor terminals 141, prevent draining of a battery, and increase a battery replacement interval. In order to quickly detect a position when water leakage occurs, it is required to detect a water leakage position after detecting water leakage using vibration data of a water pipe over a long period. On the other hand, a battery capacity is limited. Therefore, there is a trade-off here.

FIG. 2 is a block diagram showing a hardware configuration of the water leakage detection apparatus 101 according to the embodiment of the invention.

The water leakage detection apparatus 101 is a computer including a CPU 201, a main storage device 202, a network 203, a display interface (I/F) 204, an input and output interface 205, and an auxiliary storage interface 206.

The CPU 201 is a processor that executes a program stored in the main storage device 202. The main storage device 202 stores a program executed by the CPU 201 and data to be referred to by the CPU in accordance with the program. The network interface 203 is connected to the networks 121 and 122. Communication by the communication function 111 is executed via the network interface 203. The display interface 204 is connected to a display device 211 that outputs texts, images, and the like. Displaying a screen by the screen display function 114 is executed by transmitting display data to the display device 211 via the display interface 204. The input and output interface 205 is connected to an input device such as a keyboard 212 and a mouse 213.

The auxiliary storage interface 206 is connected to an auxiliary storage device 214. The auxiliary storage device 214 may be a storage device including a hard disk, a flash memory, or the like as a storage medium. The auxiliary storage device 214 stores the pipeline network information 102, the node information 103, the sensor terminal management information 104, the macro water leakage detection result 105, the micro water leakage detection result 106, the weight coefficient information 107, the integrated water leakage index 108, the threshold information 109, and the map information 110. At least a part of these pieces of information is copied to the main storage device 202 as needed, and is referred to by the CPU 201.

The auxiliary storage device 214 further stores programs executed by the CPU 201 to implement various functions of the water leakage detection apparatus 101. Specifically, the auxiliary storage device 214 stores a communication function program 221, a macro water leakage detection function program 222, a water leakage detection cooperation function program 223, and a screen display function program 224. At least some of these programs are copied to the main storage device 202, and are executed by the CPU 201 to implement the communication function 111, the macro water leakage detection function 112, the water leakage detection cooperation function 113, and the screen display function 114.

That is, in the following description, processings executed by the communication function 111, the macro water leakage detection function 112, the water leakage detection cooperation function 113, and the screen display function 114 are actually implemented by the CPU 201 controlling each unit of the water leakage detection apparatus 101 as needed according to an instruction described in the programs stored in the main storage device 202.

Although the display device 211, the keyboard 212, the mouse 213, and the auxiliary storage device 214 are connected to the water leakage detection apparatus 101 in FIG. 2, an entity including the display device 211, the keyboard 212, the mouse 213, and the auxiliary storage device 214 may be regarded as the water leakage detection apparatus 101.

FIG. 3 is a diagram showing a pipeline network and an arrangement of sensors according to the embodiment of the invention.

A dotted line indicates a water pipe, and a range divided by black circles is defined as one unit. Here, an end point of a water pipe indicated by a black circle is referred to as a node. A triangle indicates the sensor terminal 141, and is installed at a place corresponding to a node.

A pipe 301 is connected with the flow meter 123 and a pipe 302.

The pipe 302 is connected with the pipe 301, a pipe 303, and a pipe 309.

The pipe 303 is connected with the pipe 302, a pipe 304, and the pipe 309.

The pipe 304 is connected with the pipe 303, a pipe 305, and a pipe 313.

The pipe 305 is connected to the pipe 304, a pipe 306, and the pipe 313.

The pipe 306 is connected with the pipe 305, a pipe 307, and a pipe 311.

The pipe 307 is connected with the pipe 306, a pipe 308, and the pipe 311.

The pipe 308 is connected with the pipe 307.

The pipe 309 is connected with the pipe 302, the pipe 303, and a pipe 310.

The pipe 310 is connected with the pipe 309.

The pipe 311 is connected with the pipe 306, the pipe 307, and a pipe 312.

The pipe 312 is connected with the pipe 311.

The pipe 313 is connected with the pipe 304, the pipe 305, and a pipe 314.

The pipe 314 is connected with the pipe 313.

A pipe 321 is connected with the flow meter 124 and a pipe 322.

The pipe 322 is connected with the pipe 321, a pipe 323, and a pipe 327.

The pipe 323 is connected with the pipe 322, a pipe 324, and the pipe 327.

The pipe 324 is connected with the pipe 323, a pipe 325, and a pipe 329.

The pipe 325 is connected with the pipe 324, a pipe 326, and the pipe 329.

The pipe 326 is connected with the pipe 325.

The pipe 327 is connected with the pipe 322, the pipe 323, and a pipe 328.

The pipe 328 is connected with the pipe 327.

The pipe 329 is connected with the pipe 324, the pipe 325, and a pipe 330.

The pipe 330 is connected with the pipe 329.

A vibration sensor 351 is installed at a node connecting the pipe 301 and the pipe 302.

A vibration sensor 352 is installed at a node connecting the pipe 303 and the pipe 304.

A vibration sensor 353 is installed at a node connecting the pipe 305 and the pipe 306.

A vibration sensor 354 is installed at a node connecting the pipe 307 and the pipe 308.

A vibration sensor 355 is installed at a node connecting the pipe 309 and the pipe 310.

A vibration sensor 356 is installed at a node connecting the pipe 311 and the pipe 312.

A vibration sensor 357 is installed at a node connecting the pipe 313 and the pipe 314.

A vibration sensor 361 is installed at a node connecting the pipe 321 and the pipe 322.

A vibration sensor 362 is installed at a node connecting the pipe 323 and the pipe 324.

A vibration sensor 363 is installed at a node connecting the pipe 325 and the pipe 326.

A vibration sensor 364 is installed at a node connecting the pipe 327 and the pipe 328.

A vibration sensor 365 is installed at a node connecting the pipe 329 and the pipe 330.

Each of the vibration sensors 351 to 356 and 361 to 365 corresponds to the sensor terminal 141 shown in FIG. 1.

A unit for managing water pipes is referred to as a "district metered area". In FIG. 3, the water pipes 301 to 314 downstream of the flow meter 123 and the water pipes 321 to 330 downstream of the flow meter 124 belong to different district metered areas. Although only two district metered areas are described in the present embodiment for the sake of explanation, more district metered areas may be provided in practice and flow meters may be respectively installed in the district metered areas.

FIG. 4 is a diagram showing the pipeline network information 102 of the water leakage detection apparatus 101 according to the embodiment of the invention.

One row of the pipeline network information 102 includes information about one pipe. Each row of the pipeline network information 102 includes a pipe ID 401, a district metered area ID 402, a diameter 403, a material 404, a length 405, and a node ID 406.

The pipe ID 401 is a value uniquely specifying a pipe. The district metered area ID 402 is a value uniquely specifying a district metered area to which a target pipe belongs. The diameter 403 is a diameter of the target pipe, and a unit of the diameter 403 is, for example, millimeter. The material 404 is a material of the target pipe. The length 405 is a length of the target pipe, and a unit of the length 405 is, for example, meter. The node ID 406 is a value uniquely indicating nodes at both ends of the target pipe.

FIG. 4 shows, for example, the pipeline network information 102 corresponding to the pipeline shown in FIG. 3. That is, rows 411 to 424 in FIG. 4 correspond to the pipes 301 to 314 shown in FIG. 3, and rows 431 to 440 correspond to the pipes 321 to 330. In the example in FIG. 4, a value the same as a reference numeral of each pipe shown in FIG. 3 is used as a value of the pipe ID 401 of each pipe.

For example, in the row 411, the district metered area ID 402 corresponding to a value "301" of the pipe ID 401 is "1". This indicates that an ID of a district metered area to which the pipe 301 (that is, a district metered area including pipes downstream of the flow meter 123) belongs is "1". On the other hand, an ID of a district metered area including pipes downstream of the flow meter 124 is "2" (the row 431 and the like).

In the row 411, the diameter 403 is "600", the material 404 is "ductile", the length 405 is "180", and the node ID 406 is "1, 2". This indicates that a diameter of the pipe 301 is 600 millimeters, a material of the pipe 301 is ductile, a length of the pipe 301 is 180 meters, and IDs of nodes at both ends of the pipe 301 are "1" and "2". In addition to "ductile", a value of the material 404 includes "polyvinyl chloride" and the like (the row 431 and the like).

The pipeline network information 102 is set in advance and is updated together when a water pipe is updated.

FIG. 5 is a diagram showing the node information 103 of the water leakage detection apparatus 101 according to the embodiment of the invention.

One row of the node information 103 includes information about one node. Each row of the node information 103 includes a node ID 501, a latitude 502, and a longitude 503.

The node ID 501 is a value uniquely specifying a node. The latitude 502 is a latitude of a target node, and the longitude 503 is a longitude of the target node. The latitude 502 and the longitude 503 are set, for example, in an NMEA format.

FIG. 5 shows, for example, the node information 103 corresponding to the pipeline network shown in FIG. 3. That is, rows 511 to 525 in FIG. 5 correspond to nodes at both ends of the pipes 301 to 314 shown in FIG. 3, and rows 531 to 541 correspond to nodes at both ends of the pipes 321 to 330. A value of the node ID 501 corresponds to the value of the node ID 406 in FIG. 4.

For example, corresponding to the value "1" of the node ID 501, the latitude 502 is "N035244890" and the longitude 503 is "E139324059" in the row 511. The latitude 502 and the longitude 503 are set in the NMEA format.

Here, although the latitude and the longitude are set in the NMEA format, the latitude and the longitude may be set in another format such as a DMM format.

The node information 103 is set in advance and is updated together when a water pipe is updated.

FIG. 6 is a diagram showing the sensor terminal management information 104 of the water leakage detection apparatus 101 according to the embodiment of the invention.

One row of the sensor terminal management information 104 includes management information about one sensor terminal 141. Each row of the sensor terminal management information 104 includes a sensor ID 601, a node ID 602, a district metered area ID 603, a final setting change information 604, and a final setting change time 605.

The sensor ID 601 is a value uniquely specifying the sensor terminal 141 (that is, a vibration sensor shown in FIG. 3). The node ID 602 is a value uniquely specifying a node where the target sensor terminal 141 is installed. The district metered area ID 603 is a value uniquely specifying a district metered area to which the node where the target sensor terminal 141 is installed belongs. The final setting change information 604 is latest setting change information transmitted to the target sensor terminal 141. When setting change information has not yet been sent to the target sensor terminal 141, the final setting change information 604 is set to "-". The final setting change time 605 is latest time when setting change information is transmitted to the target sensor terminal 141. When setting change information has not yet been sent to the target sensor terminal 141, the final setting change time 605 is set to "-".

FIG. 6 shows, for example, the sensor terminal management information 104 for managing the sensor terminals 141 corresponding to the pipeline network shown in FIG. 3. That is, rows 611 to 617 in FIG. 6 correspond to the vibration sensors 351 to 357 shown in FIG. 3, and rows 618 to 622 correspond to the vibration sensors 361 to 365 shown in FIG. 3. In the example in FIG. 6, a value the same as a reference numeral of each vibration sensor shown in FIG. 3 is used as a value of the sensor ID 601 of each vibration sensor. A value of the node ID 602 corresponds to a value of the node ID 406 in FIG. 4.

For example, corresponding to a value "351" of the sensor ID 601, the node ID 602 is "2", the district metered area ID 603 is "1", the final setting change information 604 is "-", and the final setting change time 605 is "-" in the row 611. This indicates that the vibration sensor 351 is installed in a district metered area with a district metered area ID of "1" and setting change information has not yet been transmitted to the vibration sensor 351 (that is, setting has not yet been changed).

In the example in FIG. 6, in the row 612, the vibration sensor 352 is installed in the district metered area with a district metered area ID of "1", setting change information of "increase processing time" is transmitted to the vibration sensor 352 at "13:50:00, Dec. 17, 2017", and setting change information is not transmitted thereafter. In the row 619, the vibration sensor 362 is installed in a district metered area with a district metered area ID of "2", setting change information of "change processing mode" is transmitted to the vibration sensor 362 at "12:45:00, Dec. 16, 2017", and setting change information is not transmitted thereafter.

Basically, the sensor terminal management information 104 is set in advance, and is updated together when an arrangement of sensor terminals is changed. However, the final setting change information 604 and the final setting change time 605 are updated when the water leakage detection apparatus 101 changes setting of sensor terminals.

FIG. 7 is a diagram showing the macro water leakage detection result 105 of the water leakage detection apparatus 101 according to the embodiment of the invention.

One row of the macro water leakage detection result 105 includes information about a macro water leakage detection result such as a water leakage probability estimated in one district metered area. Each row of the macro water leakage detection result 105 includes a district metered area ID 701 and a water leakage probability 702. The district metered area ID 701 is a value uniquely indicating a district metered area. The water leakage probability 702 is a water leakage probability of a target district metered area estimated by the macro water leakage detection function 112, and a unit of the water leakage probability 702 is percent.

FIG. 7 shows, as an example, a macro water leakage detection result of each district metered area of the pipeline network shown in FIG. 3. For example, the water leakage probability 702 corresponding to the value "1" of the district metered area ID 701 is "50" in a row 711. This indicates that a water leakage probability obtained as a macro water leakage detection result of the district metered area with the district metered area ID of "1" is 50%. On the other hand, a water leakage probability obtained as a macro water leakage detection result of the district metered area with the district metered area ID of "2" is "60"% in a row 712.

The macro water leakage detection result 105 is updated when the macro water leakage detection function 112 is operated.

In the example in FIGS. 1 and 3, since the flow meters 123 and 124 are installed at water pipes, the macro water leakage detection function 112 estimates water leakage probabilities of district metered areas based on measurement data of the flow meters 123 and 124, and stores the estimated water leakage probabilities as the macro water leakage detection result 105. However, as described above, a pressure gauge (not shown) may be further installed at a water pipe. When a pressure gauge is installed, the macro water leakage detection function 112 estimates water leakage probabilities of district metered areas based on measurement data of the flow meters and the pressure gauge, and stores the estimated water leakage probabilities as the macro water leakage detection result 105.

FIG. 8 is a diagram showing the micro water leakage detection result 106 of the water leakage detection apparatus 101 according to the embodiment of the invention.

One row of the micro water leakage detection result 106 includes information about a micro water leakage detection result such as a water leakage probability estimated by one sensor terminal 141. Each row of the micro water leakage detection result 106 includes a sensor ID 801, a water leakage probability 802, and a water leakage position 803.

The sensor ID 801 is a value uniquely specifying the sensor terminal 141 (that is, a vibration sensor shown in FIG. 3). The water leakage probability 802 is a water leakage probability of a water pipe where the target sensor terminal 141 is installed, and is estimated by the water leakage detection function 144. A unit of the water leakage probability 802 is percent. The water leakage position 803 is a distance from the target sensor terminal 141 to a water leakage occurrence position (hereinafter referred to as a water leakage occurrence distance), and is estimated by the water leakage detection function 144. A unit of the water leakage position 803 is meter. When a water leakage occurrence distance is unknown, the water leakage position 803 is set to "-".

FIG. 8 shows, for example, a micro water leakage detection result obtained by the water leakage detection function 144 of each vibration sensor in the pipeline network shown in FIG. 3. That is, rows 811 to 817 in FIG. 8 show micro water leakage detection results of the vibration sensors 351 to 357, and rows 821 to 825 show micro water leakage detection results of the vibration sensors 361 to 365.

For example, corresponding to a value "351" of the sensor ID 801, the water leakage probability 802 is "18", and the water leakage position 803 is "-" in the row 811. This indicates that a water leakage probability estimated by the water leakage detection function 144 of the vibration sensor 351 is "18" percent, and a water leakage occurrence position is unknown (that is, the water leakage occurrence position is not estimated). On the other hand, a water leakage probability estimated by the water leakage detection function 144 of the vibration sensor 362 is "75" percent, and a water leakage occurrence position is a position at "45" meters from an installation position of the vibration sensor 362 in the row 822.

The micro water leakage detection result 106 is updated when the water leakage detection apparatus 101 receives the micro water leakage detection result 142 from the sensor terminal 141.

The micro water leakage detection result 106 of the water leakage detection apparatus 101 includes micro water leakage detection results sent from all of the sensor terminals 141 managed by the water leakage detection apparatus 101 as shown in FIG. 8, and the micro water leakage detection result 142 of a corresponding sensor terminal 141 only includes a micro water leakage detection result of the corresponding sensor terminal 141.

FIG. 9 is a diagram showing the weight coefficient information 107 of the water leakage detection apparatus 101 according to the embodiment of the invention.

The weight coefficient information 107 is information for associating a material of a water pipe with a weight coefficient, and includes a material 901 and a weight 902. The material 901 is a material of a water pipe. The weight 902 is a value to be multiplied by a macro water leakage detection result when an integrated water leakage index of a water pipe of a target material is calculated (that is, a weight coefficient). For example, in a row 911, the "weight" 902 corresponding to a value "ductile" of the "material" 901 is "0.9". This indicates that a weight coefficient used for a water pipe whose material is "ductile" is "0.9". Similarly, in a row 912, a weight coefficient used for a water pipe whose material is "polyvinyl chloride" is "1".

The weight coefficient information 107 is set in advance.

FIG. 10 is a diagram showing the integrated water leakage index 108 of the water leakage detection apparatus 101 according to the embodiment of the invention.

One row of the integrated water leakage index 108 includes information such as an integrated water leakage index calculated based on a micro water leakage detection result of one sensor terminal 141 and a macro water leakage detection result of a district metered area where the sensor terminal 141 is installed. Each row of the integrated water leakage indicator 108 includes a sensor ID 1001, an integrated water leakage index 1002, and a water leakage position 1003.

The sensor ID 1001 is a value uniquely specifying the sensor terminal 141. The integrated water leakage index 1002 is a value indicating a water leakage occurrence estimation result of a water pipe where the target sensor terminal 141 is installed when the macro water leakage detection result 105 and the micro water leakage detection result 106 are integrated. The water leakage position 1003 is a water leakage occurrence distance from the target sensor terminal 141 and is estimated by the water leakage detection function 144. A unit of the water leakage position 1003 is meter.

FIG. 10 shows, for example, an integrated water leakage index calculated based on a micro water leakage detection result of the water leakage detection function 144 of each vibration sensor in the pipeline network shown in FIG. 3 and a macro water leakage detection result of each district metered area. That is, rows 1011 to 1017 in FIG. 10 show integrated water leakage indexes and the like calculated based on micro water leakage detection results of the vibration sensors 351 to 357 and a macro water leakage detection result of the district metered area "1", and rows 1021 to 1025 show integrated water leakage indexes and the like calculated based on micro water leakage detection results of the vibration sensors 361 to 365 and a macro water leakage detection result of the district metered area "2".

For example, corresponding to a value "351" of the sensor ID 1001, the integrated water leakage index 1002 is "0.72" and the water leakage position 1003 is "-" in the row 1011. This indicates that an integrated water leakage index calculated based on a micro water leakage detection result of the vibration sensor 351 and a macro water leakage detection result of the district metered area "1" is "0.72", and a water leak occurrence distance is unknown. On the other hand, the row 1022 indicates that an integrated water leakage index calculated based on a micro water leakage detection result of the vibration sensor 362 and a macro water leakage detection result of the district metered area "2" is "1.41", and a water leakage occurrence distance is "45" meters.

The integrated water leakage index 108 is updated when the water leakage detection cooperation function 113 is operated.

FIG. 11 is a diagram showing the threshold information 109 of the water leakage detection apparatus 101 according to the embodiment of the invention.

The threshold information 109 is information for associating setting change content of the sensor terminal 141 with a threshold used to determine whether setting is to be changed, and includes a threshold 1101 and a setting change 1102. The threshold 1101 is a threshold of the integrated water leakage index. When the integrated water leakage index exceeds a target threshold, the setting change 1102 indicates how to change setting for the sensor terminal 141 used in calculation of the micro water leakage detection result that is a calculation source of the integrated water leakage index.

For example, the setting change 1103 corresponding to a value "1" of the threshold 1101 is "increase processing time" in a row 1111. This indicates that when an integrated water leakage index calculated based on a micro water leakage detection result of one sensor terminal 141 and a macro water leakage detection result of a district metered area to which the sensor terminal 141 belongs exceeds "1", a setting change of "increase processing time" is executed for the sensor terminal 141. On the other hand, in a row 1112, when an integrated water leakage index exceeds "1.2", a setting change of "change processing mode" is executed for the sensor terminal 141.

The threshold information 109 is set in advance.

FIG. 12 is a diagram showing the setting information 143 of the sensor terminal 141 according to the embodiment of the invention.

The setting information 143 is information indicating setting related to a processing of each sensor terminal 141, and includes a value 1202 for each attribute 1201 set in each sensor terminal 141. The attribute 1201 indicates a setting type. The value 1202 is a setting value of a target attribute.

The attribute 1201 is "processing time" in a row 1211. The processing time indicates a time width of sensor data processed by the water leakage detection function 144 of the sensor terminal 141 in a processing executed once, and the value 1202 corresponding to the processing time is "30 seconds". The attribute 1201 is a "processing cycle" in a row 1212. The processing cycle indicates a cycle in which the sensor terminal 141 executes a processing, and the value 1202 corresponding to the processing cycle is "24 hours". The attribute 1201 is a "processing mode" in a row 1213. The processing mode indicates a type of a processing executed by the water leakage detection function 144 of the sensor terminal 141, and the value 1202 corresponding to the processing mode is the "water leakage detection mode".

FIG. 13 is a flow chart showing a processing executed, based on a program, by the CPU 201 of the water leakage detection apparatus 101 according to the embodiment of the invention.

In step S1301, the water leakage detection apparatus 101 acquires micro water leakage detection results with reference to the micro water leakage detection result 106. This processing may be executed periodically, or may be executed at a timing when the micro water leakage detection results 142 are received from all of the sensor terminals 141 managed by the water leakage detection apparatus 101.

In step S1302, a loop is executed by the number of the micro water leakage detection results.

In step S1303, the water leakage detection apparatus 101 refers to the sensor terminal management information 104 to acquire the district metered area ID to which the sensor terminal 141 used in calculation of the acquired micro water leakage detection results belongs.

In step S1304, the water leakage detection apparatus 101 refers to the macro water leakage detection result 105 to acquire the macro water leakage detection result corresponding to the acquired district metered area ID.

In step S1305, the water leakage detection apparatus 101 refers to the weight coefficient information 107 to calculate the integrated water leakage index based on the acquired macro water leakage detection result and the micro water leakage detection results. Here, "integrated water leakage index=micro water leakage detection result+macro water leakage detection result×weight determined by material of water pipe×diameter/500". The calculated value is stored as the integrated water leakage index 1002 corresponding to the sensor ID 1001 of each sensor terminal 141 in the integrated water leakage index 108.

For example, for the sensor terminal 141 with a sensor ID of 351, the micro water leakage detection result is 0.18 (=18%), the corresponding district metered area ID is 1, the corresponding macro water leakage detection result is 0.5 (=50%), the weight determined by the material of the water pipe is 0.9, the diameter is 600, and thus the integrated water leakage index is 0.18+0.5×0.9×600/500=0.72.

The micro water leakage detection result is a water leakage probability estimated based on vibration data acquired by the sensor terminal 141. However, since the way vibration due to water leakage is transmitted is different depending on the material and the diameter of the water pipe, a calculation method of the integrated water leakage index is changed depending on the material and the diameter of the water pipe. For example, since it is more difficult to transmit vibration as the diameter increases, the weight of the macro water leakage detection result is increased to calculate the integrated water leakage index.

In the above example, during calculation of the integrated water leakage index, a large weight is given to the macro water leakage detection result when the water pipe less easily transmits vibration. For example, when the material of the water pipe is polyvinyl chloride, the macro water leakage detection result is multiplied by a weight coefficient larger than the weight coefficient in the case of ductile cast iron (FIG. 9). Since it is more difficult to transmit vibration as the diameter of the water pipe increases, the macro water leakage detection result is multiplied by a larger weight coefficient when the diameter of the water pipe increases.

When the material of the water pipe is ductile cast iron, such weighting may be implemented by multiplying the micro water leakage detection result by a larger weight coefficient than the weight coefficient in the case of polyvinyl chloride and multiplying the micro water leakage detection result by a larger weight coefficient when the diameter of the water pipe is reduced. An integrated water leakage index with higher reliability can be calculated by such weighting.

In step S1306, the water leakage detection apparatus 101 acquires, from the threshold information 109, the threshold 1101 of the integrated water leakage index serving as the reference for the setting change of the sensor terminal 141.

In step S1307, the water leakage detection apparatus 101 confirms whether the integrated water leakage index calculated in step S1305 exceeds the threshold 1101 corresponding to the value of "change processing mode" of the setting change 1102. When the calculated integrated water leakage index exceeds the threshold 1101 (S1307: Yes), the processing proceeds to S1310. When the calculated integrated water leakage index does not exceed the threshold 1101 (S1307: No), the processing proceeds to S1308.

In step S1308, the water leakage detection apparatus 101 confirms whether the integrated water leakage index calculated in step S1305 exceeds the threshold 1101 corresponding to the value of "increase processing time" of the setting change 1102. When the calculated integrated water leakage index exceeds the threshold 1101 (S1308: Yes), the processing proceeds to S1309. When the calculated integrated water leakage index does not exceed the threshold 1101 (S1308: No), the processing returns to S1302.

In step S1309, the water leakage detection apparatus 101 refers to the sensor terminal management information 104 and confirms whether the final setting change time 605 of the target sensor terminal 141 stores a time within a period from two days prior to current time till current time. When the final setting change time 605 stores a time within the period from two days prior to current time till current time (S1309: Yes), a setting change of increasing processing time has been executed in the two days prior to current time. In this case, the water leakage detection apparatus 101 returns the processing to S1302 without executing S1311. When the final setting change time 605 does not store a time within in the period from two days prior to current time till current time (S1309: No), the processing proceeds to S1311.

In step S1310, the water leakage detection apparatus 101 refers to the sensor terminal management information 104 and confirms whether the final setting change information 604 of the target sensor terminal 141 is "change processing mode", and whether the final setting change time 605 stores a time within a period from two days prior to current time till current time. When the final setting change information 604 is "change processing mode" and the final setting change time 605 stores a time within the period from two days prior to current time till current time (S1310: Yes), the processing mode has been changed in the two days prior to current time. In this case, the water leakage detection apparatus 101 returns the processing to S1302 without executing S1311. When the final setting change information 604 is not "change processing mode" or the final setting change time 605 does not store a time within the period from two days prior to current time till current time (S1310: No), the processing mode has not been changed in the two days prior to current time. In this case, the water leakage detection apparatus 101 proceeds the processing to S1311.

"Two days" in S1309 and S1310 is an example, and any time can be set as needed.

In step S1311, the water leakage detection apparatus 101 transmits setting change information to the sensor terminal 141. Specifically, in a case where S1311 is executed when S1307: No, S1308: Yes, and S1309: No, the water leakage detection apparatus 101 transmits, to the sensor terminal 141, setting change information instructing to increase the processing time. The setting change function 146 of the sensor terminal 141 that received the setting change information increases the value 1202 of the processing time of the setting information 143 (the row 1211 in FIG. 12).

On the other hand, in a case where S1311 is executed when S1307: Yes and S1310: No, the water leakage detection apparatus 101 transmits, to the sensor terminal 141, setting change information instructing to change the processing mode from the water leakage detection mode to the water leakage position detection mode. The setting change function 146 of the sensor terminal 141 that received the setting change information changes the value 1202 of a processing mode of the setting information 143 (the row 1213 in FIG. 12) to the "water leakage position detection mode".

Here, the setting change information is transmitted to the sensor terminal 141 at a timing when the integrated water leakage index is compared with the threshold 1101 of the threshold information 109, whereas in a case where a timing when information can be transmitted from the water leakage detection apparatus 101 to the sensor terminal 141 is limited, the setting change information to be transmitted may be temporarily stored in the water leakage detection apparatus 101, and when the information can be transmitted to the sensor terminal 141, the setting change information stored in the water leakage detection apparatus 101 may be transmitted to the sensor terminal 141.

In step S1312, the water leakage detection apparatus 101 updates the sensor terminal management information 104. Here, the final setting change information 604 and the final setting change time 605 of the sensor terminal management information 104 are updated.

In step S1313, the water leakage detection apparatus 101 updates a display screen.

For example, this processing was executed at 10:00:00 on Dec. 18, 2017.

At this time, the integrated water leakage index of the sensor terminal 141 with the sensor ID 351 is 0.72 as described above. In this case, in S1307, since it is determined that the integrated water leakage index does not exceed 1.2 which is the threshold of changing the processing mode, the processing proceeds to S1308. Next, in S1308, since the integrated water leakage index does not exceed 1 which is the threshold of increasing the processing time, the processing proceeds to S1302. As described above, since processing time is not increased for the sensor terminal 141 of the water pipe that is determined to have a low occurrence probability of water leakage, battery draining of the sensor terminal 141 is prevented.

For the sensor terminal 141 with the sensor ID 352, the micro water leakage detection result is 0.61 (=61%), the corresponding district metered area ID is 1, the corresponding macro water leakage detection result is 0.5 (=50%), the weight determined by a material of the water pipe is 0.9, the diameter is 600, so that the integrated water leakage index is 0.61+0.5×0.9×600/500=1.15. In this case, since the integrated water leakage index does not exceed 1.2 which is the threshold of changing the processing mode, the processing proceeds to S1308. Next, in S1308, since it is determined that the integrated water leakage index exceeds 1 which is the threshold of increasing the processing time, the processing proceeds to S1309. Next, in S1309, since the period from the final setting change time 605 of the target sensor terminal 141 (13:50:00, Dec. 17, 2017) to current time (10:00:00, Dec. 18, 2017) is within 2 days, the processing returns to S1302. Accordingly, since the setting change is controlled so as not to frequently increase the processing time, battery draining of the sensor terminal 141 is prevented.

For the sensor terminal 141 with the sensor ID 353, the micro water leakage detection result is 0.5 (=50%), the corresponding district metered area ID is 1, the corresponding macro water leakage detection result is 0.5 (=50%), the weight determined by the material of the water pipe is 0.9, and the diameter is 600, so that the integrated water leakage index is 0.5+0.5×0.9×600/500=1.04. In this case, since the integrated water leakage index does not exceed 1.2 which is the threshold of changing the processing mode, the processing proceeds to S1308. Next, in S1308, since it is determined that the integrated water leakage index exceeds 1 which is the threshold of increasing the processing time, the processing proceeds to S1309. Next, in S1309, no values are not stored in the final setting change time 605 of the target sensor terminal 141. This indicates that the setting change of the sensor terminal 141 has not yet been executed. That is, since the setting change has not been executed in two days prior to current time, the processing proceeds to S1311, and the setting change is executed so as to increase the processing time of the target sensor terminal 141. Accordingly, since the processing time is increased for the sensor terminal 141 of a water pipe where water leakage is likely to occur, a water leakage detection result with higher accuracy can be acquired in an early stage.

For the sensor terminal 141 with the sensor ID of 362, the micro water leakage detection result is 0.75 (=75%), the corresponding district metered area ID is 2, the corresponding macro water leakage detection result is 0.6 (=60%), the weight determined by the material of the water pipe is 1, and the diameter is 550, so that the integrated water leakage index is 0.75+0.6×1×550/500=1.41. In this case, since the integrated water leakage index exceeds 1.2 which is the threshold of changing the processing mode, the processing proceeds to S1310. Next, in S1310, since the final setting change information 604 of the target sensor terminal 141 is "change processing mode" and the value of the final setting change time 605 is within the period from two days prior to current time till current time, the processing returns to S1302.

For the sensor terminal 141 with the sensor ID 363, the micro water leakage detection result is 0.55 (=55%), the corresponding district metered area ID is 2, the corresponding macro water leakage detection result is 0.6 (=60%), the weight determined by the material of the water pipe is 1, and the diameter is 550, so that the integrated water leakage index is 0.55+0.6×1×550/500=1.21. In this case, since the integrated water leakage index exceeds 1.2 which is the threshold of changing the processing mode, the processing proceeds to S1310. Next, in step S1310, since the final setting change information 604 of the target sensor terminal 141 indicates to change the processing mode, but final setting change time 605 is not within the period from two days prior to current time till current time, the processing proceeds to step S1311, and the setting change is executed to change the processing mode of the target sensor terminal 141. Specifically, the processing mode (the row 1213 in FIG. 12) is changed from the water leakage detection mode to the water leakage position detection mode. Accordingly, the water leakage position can be estimated by quickly executing the processing of the water leakage position detection mode considering the macro water leakage detection result only for the sensor terminal 141 in a water pipe where water leakage is particularly likely to occur.

FIG. 14 is a diagram showing a water leakage detection result display screen output by the water leakage detection apparatus 101 according to the embodiment of the invention.

The screen display function 114 controls the display interface 204 and the display device 211 to display screens 1401 and 1411 shown in FIG. 14.

The screen 1401 (FIG. 14 (a)) shows a screen on which no water leakage is detected. An outlined band-like area 1402 indicates a road, and a map is displayed on a background in this manner. The map is displayed based on the map information 110. In addition, the node information 103 and the sensor terminal management information 104 are used to display a water pipe 1403 indicated by a straight line and a sensor terminal 1404 indicated by a triangle.

The screen 1411 (FIG. 14 (b)) shows a screen on which water leakage is detected. Display of water pipes is changed according to the macro water leakage detection result 105. Here, when it is determined that a water leakage probability in a certain district metered area becomes higher (for example, than a predetermined threshold), display of a corresponding water pipe is changed to a dotted line 1412. Display of sensor terminals is changed according to the micro water leakage detection result 106. Here, when it is determined that a water leakage probability detected by a certain sensor becomes higher (for example, than a predetermined threshold), a corresponding sensor terminal 1413 is indicated by a black triangle. When the micro water leakage detection result 106 includes a result of estimation of a water leakage position, a water leakage occurrence place 1414 derived from the estimated water leakage position is indicated by a black circle. It is easy to know a place where an occurrence probability of water leakage is high according to such display.

Detailed information about a sensor terminal is displayed in a dialog 1415. In an example in FIG. 14, a sensor ID, a water leakage probability (a water leakage probability included in the micro water leakage detection result 106 in this example), an integrated water leakage index, a water leakage distance (that is, the water leakage position included in the micro water leakage detection result 106), a processing time, a processing cycle, and a processing mode are displayed. As described above, a water leakage detection result with high accuracy can be provided by displaying a calculated integrated water leakage index together with a water leakage probability included in the macro water leakage detection result 105 and a water leakage probability included in the micro water leakage detection result 106.

The embodiment of the invention has been described above with reference to the drawings. However, the invention is not limited to matters described in the embodiment described above, and it is apparent that the invention can be changed and modified within a scope of claims.

For example, although "integrated water leakage index=micro water leakage detection result+macro water leakage detection result×weight determined by material of water pipe×diameter/500" in the present embodiment, a value of the integrated water leakage index may be determined by another formula. For example, the integrated water leakage index may be calculated by combining the micro water leakage detection result and the macro water leakage detection result according to a formula including the flow rate in the water pipe, or may be calculated by combining the micro water leakage detection result and the macro water leakage detection result according to a formula including a moisture content of soil around the water pipe. For example, the integrated water leakage index may be calculated using only one of the micro water leakage detection result and the macro water leakage detection result.

Although changing the processing time (the row 1211 in FIG. 12) and changing the processing mode (the row 1213 in FIG. 12) are executed (S1311 in FIG. 13) according to the integrated water leakage index in the embodiment described above, another setting change may be executed. For example, when the integrated water leakage index exceeds the threshold in S1308, the water leakage detection apparatus 101 may transmit setting change information for executing a change to shorten the processing cycle (the row 1212 in FIG. 12) instead of extending the processing time of the sensor terminal 141. Accordingly, the frequency at which the sensor terminal 141 executes the processing is increased. Alternatively, the water leakage detection apparatus 101 may transmit setting change information to simultaneously execute the change of extending the processing time and the change of shortening the processing cycle.

When any one setting change of extending the processing time and shortening the processing cycle (that is, increasing the processing frequency) is executed, a water leakage detection result with high accuracy that is obtained based on the measurement data (that is, the vibration data) of the sensor terminal 141 can also be acquired in an early stage.

Although the water leakage detection apparatus 101 calculates once, by the loop of processings (FIG. 13), the integrated water leakage indexes 108 related to all of the sensor terminals 141, the water leakage detection apparatus 101 may calculate an individual integrated water leakage index 108 at a timing when the micro water leakage detection result 142 is received from each sensor terminal 141.

The invention is not limited to the embodiments described above, and includes various modifications. For example, the embodiments described above have been described in detail for better understanding of the invention, and the invention is not necessarily limited to those including all configurations described above.

Configurations, functions, processing units, processing methods and the like described above may be partially or entirely implemented by hardware such as through design using an integrated circuit. The configurations, functions, and the like described above may also be implemented by software by a processor interpreting and executing a program for implementing respective functions. Information such as a program, a table, or a file for implementing the functions can be stored in a storage device such as a non-volatile semiconductor memory, a hard disk drive, and a solid state drive (SSD), or a computer readable non-transitory data storage medium such as an IC card, an SD card, and a DVD.

Further, control lines and information lines show those considered to be necessary for description, and not all of the control lines and the information lines are necessarily shown in a product. In practice, it may be considered that almost all of the configurations are connected to each other.

The invention claimed is:

1. A water leakage detection method for detecting water leakage of a water pipe (301-330) by a water leakage detection apparatus (101) that includes a processor (201), and a communication device (203), the water leakage detection method comprising:
    a first procedure of the processor acquiring (S1301) a water leakage detection result (106) of the water pipe obtained based on measurement data of a vibration sensor terminal (141) attached to the water pipe,
    wherein either a water leakage detection mode in which occurrence of water leakage is detected based on a result obtained by measuring vibration, or a water leakage position detection mode in which a water leakage position is detected based on a result obtained by measuring vibration, is set in the vibration sensor terminal,
    characterized in that
    the water leakage detection apparatus further includes a display device (204), and
    a second procedure of the processor acquiring (S1304) a water leakage detection result (105) of the water pipe in a district metered area obtained based on measurement data of a flow meter (123, 124) attached to the water pipe, wherein the district metered area is a range to be measured by the flow meter and the vibration sensor terminal is attached to the water pipe in the district metered area,
    a third procedure of the processor outputting (S1313), via the display device, a screen (1401, 1411) for displaying the water leakage detection result obtained based on the measurement data of the flow meter together with the water leakage detection result obtained based on the measurement data of the vibration sensor terminal;
    a fourth procedure of the processor calculating (S1305) an integrated water leakage index (108) indicating a magnitude of an occurrence probability of water leakage in the water pipe based on the water leakage detection result obtained based on the measurement data of the flow meter and the water leakage detection result obtained based on the measurement data of the vibration sensor terminal, wherein in the third procedure, the processor displays the integrated water leakage index calculated in the fourth procedure on the screen, and
    a fifth procedure of the processor transmitting (S1311), when the integrated water leakage index exceeds a predetermined threshold (1101), an instruction of changing setting related to a processing of the vibration sensor terminal to the vibration sensor terminal via the communication device,
    wherein in the fifth procedure, the processor transmits an instruction of changing a processing mode of the vibration sensor terminal from the water leakage detection mode to the water leakage position detection mode as the instruction of changing the setting related to the processing of the vibration sensor terminal.

2. The water leakage detection method according to claim 1, wherein
    a frequency of a processing of measuring vibration to detect water leakage, a processing time indicating a time width of measurement data used in the processing, and a processing mode are set in the vibration sensor terminal,
    the processing mode is either the water leakage detection mode in which occurrence of water leakage is detected based on a result obtained by measuring vibration or the water leakage position detection mode in which a water leakage position is detected based on a result obtained by measuring vibration, and
    in the fifth procedure, the processor:
        when the integrated water leakage index exceeds a first threshold (1101) and does not exceed a second threshold larger than the first threshold (1101), transmits at least one of an instruction of increasing the processing time indicating the time width of the measurement data used in the processing of the vibration sensor terminal and an instruction of increasing the frequency of the processing of the vibration sensor terminal as the instruction of changing the setting related to the processing of the vibration sensor terminal, and
        when the integrated water leakage index exceeds the second threshold, transmits the instruction of changing the processing mode of the vibration sensor terminal from the water leakage detection mode to the water leakage position detection mode as the instruction of changing the setting related to the processing of the vibration sensor terminal.

3. The water leakage detection method according to claim 2, wherein
    in the fifth procedure, the processor:
        in a case where the integrated water leakage index exceeds the first threshold and does not exceed the second threshold larger than the first threshold, when at least one setting change of increasing the processing time indicating the time width of the measurement data used in the processing of the vibration sensor terminal and increasing the frequency of the processing of the vibration sensor terminal is executed within a predetermined time prior to current time, does not transmit at least one of the instruction of increasing the processing time indicating the time width of the measurement data used in the processing of the vibration sensor terminal and the instruction of increasing the frequency of the processing of the vibration sensor terminal, and
        in a case where the integrated water leakage index exceeds the second threshold, when a setting change of changing the processing mode of the vibration sensor terminal from the water leakage detection mode to the water leakage position detection mode is executed within a predetermined time prior to current time, does not transmit the instruction of changing the processing mode of the vibration sensor terminal from the water leakage detection mode to the water leakage position detection mode.

4. The water leakage detection method according to claim 1, wherein
    in the fourth procedure, the processor calculates the integrated water leakage index based on a characteristic of the water pipe to which the vibration sensor terminal is attached.

5. The water leakage detection method according to claim 4, wherein
The characteristic of the water pipe to which the vibration sensor terminal is attached is a material (901) of the water pipe, and
in the fourth procedure, the processor calculates the integrated water leakage index such that a weight (902) of the water leakage detection result obtained based on the measurement data of the flow meter is increased as a material (901) of the water pipe to which the vibration sensor terminal is attached is a material that less easily transmits vibration.

6. The water leakage detection method according to claim 4, wherein
The characteristic of the water pipe to which the vibration sensor terminal is attached is a diameter (403) of the water pipe, and
in the fourth procedure, the processor calculates the integrated water leakage index such that a weight of the water leakage detection result obtained based on the measurement data of the flow meter is increased as the diameter of the water pipe to which the vibration sensor terminal is attached increases.

7. The water leakage detection method according to claim 1, wherein
a pressure gauge is further attached to the water pipe, and
in the second procedure, the processor acquires the water leakage detection result of the water pipe in the district metered area obtained based on the measurement data of the flow meter and measurement data of the pressure gauge.

8. The water leakage detection method according to claim 1, wherein
the water leakage detection apparatus further includes a storage device (202),
the storage device stores map information (110) of an area where the water pipe is installed, position information of the water pipe, and position information of the vibration sensor terminal, and
in the third procedure, the processor, via the display device:
displays a map of the area where the water pipe is installed,
displays, on the map, a position of a water pipe in a district metered area where a water leakage probability included in the water leakage detection result obtained based on the measurement data of the flow meter exceeds the predetermined threshold,
when the water leakage detection result obtained based on the measurement data of the vibration sensor terminal exceeds the predetermined threshold, displays a position of the vibration sensor terminal on the map, and
when the water leakage detection result obtained based on the measurement data of the vibration sensor terminal includes a result in which a water leakage position (803) is detected, displays the water leakage position on the map.

9. A water leakage detection apparatus (101) comprising:
a processor (201); and
a communication device (203), wherein
the processor is configured to:
acquire (S1301) a water leakage detection result (106) of a water pipe (301-330) obtained based on measurement data of a vibration sensor terminal (141) attached to the water pipe,
characterized in that the water leakage detection apparatus further comprises
a display device (204), and
the processor is further configured to:
acquire (S1304) a water leakage detection result (105) of the water pipe in a district metered area obtained based on measurement data of a flow meter (123, 124) attached to the water pipe, wherein the district metered area is a range to be measured by the flow meter and the vibration sensor terminal is attached to the water pipe in the district metered area,
calculate (S1305) an integrated water leakage index (108) indicating a magnitude of an occurrence probability of water leakage in the water pipe based on the water leakage detection result obtained based on the measurement data of the flow meter and the water leakage detection result obtained based on the measurement data of the vibration sensor terminal,
output (S1313), via the display device, a screen for displaying the integrated water leakage index, and
when the integrated water leakage index exceeds a predetermined threshold (1101), transmit S1311) an instruction of changing setting related to a processing of the vibration sensor terminal to the vibration sensor terminal via the communication device,
wherein the instruction of changing setting related to a processing of the vibration sensor terminal is an instruction of changing a processing mode of the vibration sensor terminal from a water leakage detection mode in which occurrence of water leakage is detected based on a result obtained by measuring vibration to a water leakage position detection mode in which a water leakage position is detected based on a result obtained by measuring vibration.

* * * * *